June 17, 1958     C. E. BEYER ET AL     2,839,422
METHOD FOR LUBRICATING POLYSTYRENE GRANULES AND
ENHANCED MOLDING GRANULES THEREBY OBTAINED
Filed Feb. 17, 1956
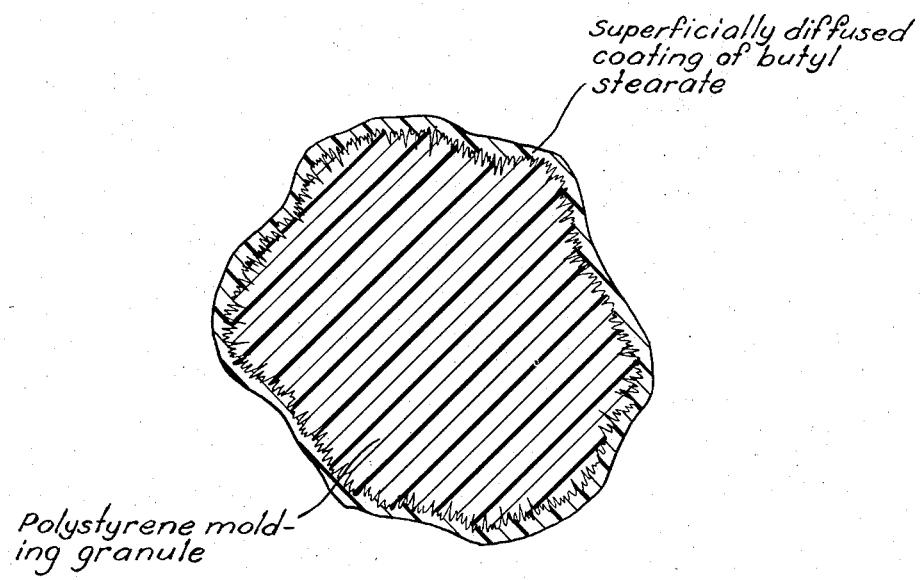
INVENTORS.
Carlton E. Beyer
Robert B. Dahl
BY
Griswold & Burdick
ATTORNEYS

United States Patent Office 2,839,422
Patented June 17, 1958

2,839,422

METHOD FOR LUBRICATING POLYSTYRENE GRANULES AND ENHANCED MOLDING GRANULES THEREBY OBTAINED

Carlton E. Beyer and Robert B. Dahl, Midland, Mich., assignors to The Dow Chemical Company, Midland, Mich., a corporation of Delaware Application February 17, 1956, Serial No. 566,208

6 Claims. (Cl. 117—4)

Various internal lubricating constituents are frequently incorporated in molding compositions comprised of thermoplastic resinous materials. Such constituents are beneficial in many respects for the compositions. Usually, for example, they improve the mold release characteristics of the compositions. In injection molding practice they may permit faster molding cycles and lower, more moderate working pressures without impairing the surface properties of the product. This result is due to the decrease in the molding and plastic flow temperatures which may be attributed to the presence of the lubricant. In this connection, butyl stearate has been proposed among other compounds as an advantageous internal lubricant for polystyrene and like molding compositions by Earle L. Kropscott and Melvin J. Hunter in U. S. Patent No. 2,357,833. In the manner of conventional practice, the therein-contained disclosure teaches the intimate incorporation of the butyl stearate in a uniform dispersion throughout the composition.

Certain difficulties, however, are attendant the internal provision of lubricants in molding compositions. For example, the amounts which may be beneficial to ameliorate injection molding practice are also sufficiently plastifying of the composition to lower its heat distortion temperature to an undesirable level. Other vexations may be encountered when more suitable shapes of the internally lubricated composition, such as granules, are prepared by or after extrusion techniques through devolatilizing apparatus due to the tendency of the lubricant to be removed in the operation. It would be highly advantageous to derive the benefits of employing butyl stearate as a lubricant in polystyrene molding compositions without occasioning or incurring the difficulties which may accrue when it is internally employed in the conventional manner.

To the attainment of this end, this invention relates to an improved method for lubricating polystyrene granules with butyl stearate and to the enhanced polystyrene molding granules which thereby may be obtained.

The practice of the invention provides for many advantages. The polystyrene granules lubricated in accordance with the invention have highly desirable characteristics for injection molding purposes. They may be injection molded in relatively shorter cycles with less granular friction than may be experienced with unlubricated granules to prepare well molded articles which have heat distortion temperatures that are essentially equivalent to and substantially unreduced from that of unlubricated polystyrene molded articles. In comparison with unlubricated granules, their injection molding may be accomplished with less attendant granular friction and with decreased injection pressure or temperature, or both, requirements. The amount of butyl stearate which is employed for lubricating purposes is significantly smaller than that which is required for its satisfactory use as an internal lubricant. In addition, the method of the invention permits the employment of butyl stearate as a lubricant even when the polystyrene molding composition is fabricated into granules, pellets or beads and the like with or following the use of devolatilizing extruders operating at temperatures which would militate against internally incorporating it in the composition prior to its extrusion.

According to the invention, enhanced polystyrene granules and the like for injection molding purposes may advantageously be prepared by an improved lubricating method which comprises preferentially plastifying their outer surface with a superficially diffused coating of butyl stearate. Preferably, the coated granules, one of which (greatly magnified) is cross-sectionally illustrated in the accompanying drawing, contain between about 0.1 and 1.0 and, more preferably, between about 0.2 and 0.5 percent by weight of the butyl stearate which is physically concentrated in the superficially diffused layer. Advantageously, the butyl stearate may be applied, while it is at a temperature between about 100 and 160° F., to the surface of a shaped article (such as a pellet or strand and the like) of polystyrene which is at a temperature of at least about 250° F. and, preferably, not in excess of about 350° F. In many instances, superior results may be achieved if the coated article is permitted to cool at a relatively slow rate after application of the butyl stearate in order to allow a more beneficial superficial diffusion to occur.

While various dip and spray techniques may be employed suitably for applying the butyl stearate to the surface of various polystyrene shapes, it is frequently convenient to apply it to a freshly extruded strand before it is cut into granules suitable for molding. This may be accomplished by passing the extruded strand through a suitably heated aqueous bath in which the butyl stearate is immiscibly provided by flotation which advantageously may be while it is in a relatively fine, non-emulsified dispersion or surface distribution. Ordinarily an aqueous bath containing, in this manner, a relatively thin surface layer of the butyl stearate can be utilized for satisfactory application. If desired, the bath may contain minor proportions of a surfactant in order to minimize the tendency of the butyl stearate layer to agglomerate and to cause it to be present in the layer in the form of a plurality of individual droplets or globules. Such a condition facilitates superior and more uniform pick-up of the butyl stearate by the strand. The pick-up under such circumstances depends upon the temperatures of the strand and of the bath with a given accumulation of butyl stearate, within relatively wide ranges, in the surface layer on the bath. Too high a strand temperature may interfere with the attainment of a desirably uniform coating while too low a bath temperature may cause the butyl stearate to have a surface tension which may be excessive for best results.

Usually an optimum bath temperature is in the neighborhood of about 140–160° F. and an optimum strand temperature in the neighborhood of about 250° F. when relatively rapid bath throughput is effected for the strand. A desirable butyl stearate pick-up can readily be obtained under such conditions. It is often beneficial to agitate or circulate the bath during application. Under some circumstances, it may be desirable to wipe the coated strand by suitable means to remove excessive quantities of butyl stearate, although in most cases this may not be necessary if careful regulation of the butyl stearate layer is maintained. Oftentimes, it may also be advantageous to subject the coated strand to a heated atmosphere, as may be provided by exposure to infra red lamps or other heating means, in order to facilitate its slow cooling for purposes of better superficial diffusion of the applied butyl stearate.

In a series of illustrative examples, various injection molding pellets were surface coated with butyl stearate by dip application of a freshly extruded strand from a devolatilizing extruder through a relatively thin butyl stearate layer on an aqueous bath in the above described manner prior to the strand cutting operation. Granules were obtained containing different amounts which ranged from about 0.3 to 0.6 percent by weight of superficially diffused butyl stearate. In injection molding tests with the granules, they were found to provide excellent moldings with decreases on the order of as much as one-fifth in either the molding pressures or temperatures which were required for suitable operation and with molding cycles which were foreshortened by as much as 30 percent in comparison to those which were required for unlubricated granules of polystyrene. Further, the surface lubricated granules had equivalent or superior injection molding properties as compared to similar polystyrene granules which were internally lubricated with 2½ percent by weight of butyl stearate and their heat distortion temperatures were as much as 30° F. higher than that of the moldings from internally lubricated granules. The advantageous features of the surface lubricated granules were the probable result of their ability to surface melt quickly and to flow freely during the injection molding cycle due to the availability of the superficially diffused butyl stearate which was not present in sufficient plastifying quantities to significantly lower the heat-distortion temperature of the polystyrene in the molded articles. When clear moldings were prepared from surface lubricated granules containing more than about 0.4 percent by weight of butyl stearate in the superficially diffused layer, it was advantageous to use a mixing nozzle with the injection molding apparatus to avoid a slight waviness which was otherwise discernible in the molded article.

Although it has been particularly illustrated with butyl stearate and polystyrene, which are preferred materials for a wide variety of applications, it is to be understood that the invention is susceptible of being satisfactorily practiced with their equivalents. Thus, other suitable and compatible plasticizers and lubricants having properties and characteristics commensurate with butyl stearate can be employed for polystyrene and other thermoplastic resinous materials and particularly other alkenyl aromatic compounds which may be comprised of polymers and copolymers containing at least about 50 percent by weight of at least one compound having the general formula, $Ar-CR=CH_2$, wherein Ar is aromatic and R is selected from the group consisting of a hydrogen atom and a methyl radical, including especially various copolymers of styrene and polymers and copolymers of ar-methyl styrene or vinyl toluene, mono- and di-chlorostyrene, ar-dimethyl styrene and the like.

What is claimed is:

1. Lubricating method for the preparation of enhanced polymer granules for injection molding purposes, said granules being comprised of alkenyl aromatic polymeric materials that contain at least about 50 percent by weight of at least one compound having the general formula, $Ar-CR=CH_2$, wherein Ar is aromatic and R is selected from the group consisting of hydrogen and a methyl radical, which method comprises preferentially plastifying the outer surface of said granules by applying to said granules, while they are at a temperature between about 250° F. and 350° F., a superficially diffused coating in an amount between about 0.1 and 1.0 percent by weight of butyl stearate, based on the weight of the granules, said butyl stearate being at a temperature between about 100 and 160° F.

2. Method for the preparation of enhanced lubricated polystyrene granules for injection molding purposes which comprises extruding polystyrene into a strand; dipping said strand at a temperature between about 250 and 350° F. into an aqueous bath at a temperature between about 100 and 160° F. in which there is immiscibly provided butyl stearate in a substantially non-emulsified condition; withdrawing said strand from said bath so as to contain a superficially diffused coating of said butyl stearate in an amount between about 0.1 and 1.0 percent by weight, based on the weight of the strand; and cutting said strand into granules suitable for injection molding purposes.

3. The method of claim 2 wherein the temperature of the bath is in the neighborhood of 140–160° F.

4. The method of claim 2 and including the step of wiping excessive quantities of butyl stearate from the strand while withdrawing it from the bath so as to provide in said strand a superficially diffused coating of the butyl stearate in an amount between about 0.1 and 1.0 percent by weight, based on the weight of the strand.

5. The method of claim 2 and including the step of slowly cooling the strand containing the superficially diffused coating of butyl stearate after said strand is withdrawn from said bath and before it is cut.

6. The method of claim 2 wherein the bath is agitated.

References Cited in the file of this patent

UNITED STATES PATENTS

| 2,067,174 | Dickie et al. | Jan. 12, 1937 |
| 2,357,833 | Kropscott et al. | Sept. 12, 1944 |
| 2,358,963 | Davies | Sept. 26, 1944 |